H. H. HIGERT.
COMBINED NUT SERVING AND CRACKING DEVICE.
APPLICATION FILED MAR. 25, 1916.

1,205,993.

Patented Nov. 28, 1916.
2 SHEETS—SHEET 1.

INVENTOR
Henry H. Higert,
By Minturn & Woerner
ATTORNEYS.

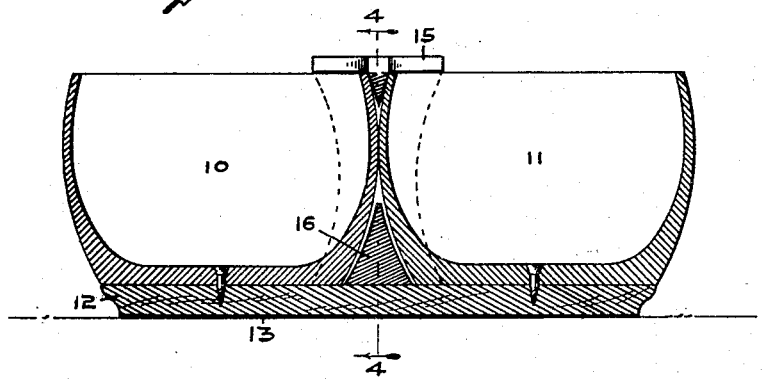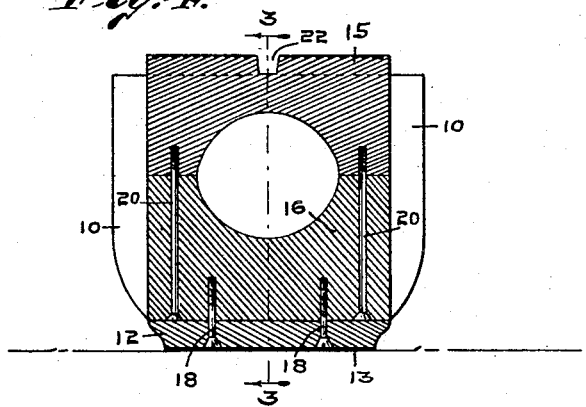

UNITED STATES PATENT OFFICE.

HENRY H. HIGERT, OF INDIANAPOLIS, INDIANA.

COMBINED NUT SERVING AND CRACKING DEVICE.

1,205,993.  Specification of Letters Patent.  Patented Nov. 28, 1916.

Application filed March 25, 1916. Serial No. 86,788.

*To all whom it may concern:*

Be it known that I, HENRY H. HIGERT, a citizen of the United States, residing at Indianapolis, in the county of Marion and State of Indiana, have invented certain new and useful Improvements in Combined Nut Serving and Cracking Devices, of which the following is a specification.

This invention relates to a device for individual use when serving palatable, savory nuts; and one of the objects of the invention consists in the provision of a device of the above character in which each individual can be independently served with palatable, savory nuts in a convenient and esthetic way.

A further object of the invention consists in the provision of a device of the above character in which the nuts served to each individual can be conveniently cracked; the device being arranged to keep the cracked nuts separated from the uncracked nuts.

A still further object of the invention consists in the provision of a device of the above character wherein a receptacle for holding the uncracked nuts and a like receptacle for receiving the cracked nuts are conveniently arranged with an intervening anvil upon which the nuts may be cracked, the said anvil being arranged to receive and deliver the force of the blows, in cracking the nuts, away from the nut holding receptacles.

I accomplish the objects of the invention by means of the construction illustrated in the accompanying drawings, forming a part hereof, in which—

Figure 1:
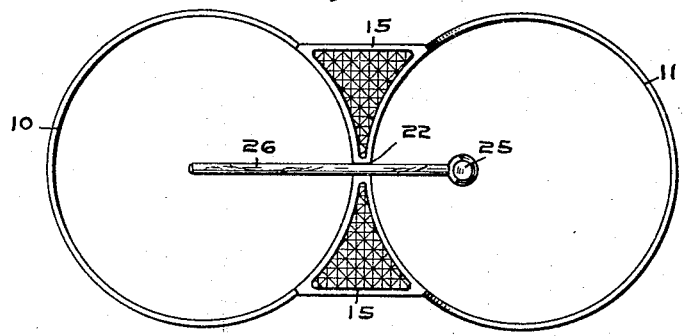
Figure 2:
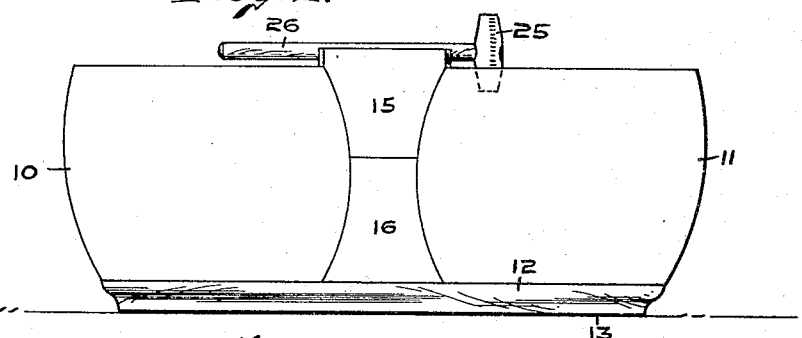
Figure 3:
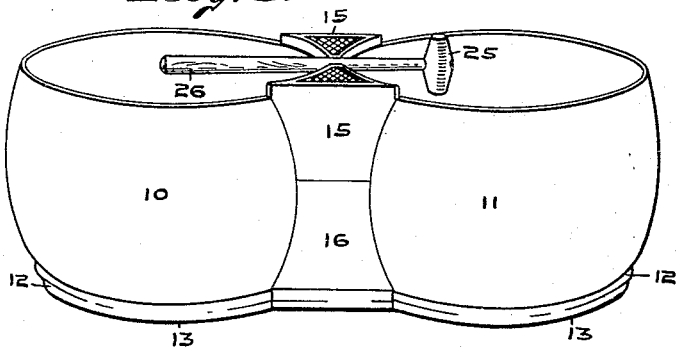

Figure 1 is a top or plan view of the device. Fig. 2 is a side elevation of the construction shown in Fig. 1. Fig. 3 is a longitudinal sectional view through the center of the device, on the line 3—3 in Fig. 4. Fig. 4 is a cross section on the line 4—4 in Fig. 3. Fig. 5 is a perspective view of the device.

Referring to the drawings, 10 and 11 represent a pair of receptacles acting as repositories for the uncracked and cracked nuts. The receptacles 10 and 11 may be composed of wood, porcelain, glass or suitable compositions as expediency may dictate. The receptacles 10 and 11 are arranged side by side for compactness and are mounted securely upon a base-plate 12 in any suitable manner, the base-plate simplifying portability and allowing the device to easily rest upon the lap of the individual. The under surface of the base 12 may be covered with cloth or felt 13 to prevent marring the surface of any article of furniture upon which the device may be resting.

Arranged between and extending on both sides of a plane line drawn through the longitudinal center of the receptacles 10 and 11 is an anvil upon the upper surface of which the cracking of the nuts is effected. The anvil rests firmly upon the base-plate 12 and extends upward and somewhat above the upper edges of the receptacles 10 and 11. The anvil is preferably composed of metal, and as it extends outward on both sides of a line through the longitudinal center of the receptacles it follows the contour of said receptacles to its full extent, so that nut cracking surfaces of varying widths are presented from the center of the anvil to its outer side edges. See Fig. 1. The anvil may be formed as a unit member if desired, but on account of its peculiar shape requiring additional care in molding which adds to its cost I have found it desirable to form the anvil in two parts or sections, by dividing the anvil either vertically or horizontally. The central portion of the web of the anvil is preferably omitted, for the reason that a saving in metal and weight of the entire device is effected, and, moreover, providing space for any slight irregularities that are often found on the exterior contour when the receptacles 10 and 11 are formed of pottery material and produced in the manner in which pottery articles are manufactured. As heretofore stated, the anvil may be divided vertically along the line 3—3 in Fig. 4, or divided transversely along the full line shown in Fig. 4. Of these two lines of division I have found it preferable to divide the anvil transversely, providing an upper section 15 and a lower section 16, as clearly shown in Fig. 4, for the reason in so doing, on account of omitting the central portion of the anvil-web, the resultant arch forms a support for the crown of the anvil-section 15 which receives the first impulses of the blows delivered by the hammer in cracking the nuts.

The lower anvil-section 16 is firmly secured to the base-plate 12 by means of suitable screws 18, and the upper anvil-section 15 is securely held in place upon the lower section 16 by means of the screws 20 which pass freely through the lower section and are threaded into the upper section 15. The upper and central portion of the crown of anvil-section 15 may be provided with a wedge shaped notch 22 which forms a convenient means for holding the hammer 25 when not in use, the wedge shaped sides of notch 22 impinging tightly against the sides of the hammer handle 26 when the latter is forced down into said notch.

As heretofore stated in the specification, the receptacles 10 and 11 may be formed of wood of any character, or may be stained to match the interior finish or furniture of a room, or the said receptacles may be formed of glass—common or cut glass—porcelain or pottery material, with exterior embellishments of infinite variety to satisfy every artistic and esthetic taste, and on account of the fragility of many of the materials of which the receptacles 10 and 11 may be composed, I have found it desirable to so mount the anvil on the base-plate 12 that no force of the blows delivered upon the crown of the anvil in cracking the nuts will be delivered to said receptacles 10 and 11. With this construction in mind, I am enabled to form the receptacles out of fragile material, if desired, and thus enable me to employ those materials which are suitable and which expediency dictates in carrying my invention into practice.

Having thus fully described my said invention, what I desire to secure by Letters Patent, is—

1. The combination, with a portable base, of a plurality of nut holding receptacles mounted upon said base and spaced apart from each other, and an anvil mounted on the base independently of the receptacles to form a filling member in the space between said receptacles.

2. The combination, with a portable base, of a plurality of nut holding receptacles mounted upon said base and spaced apart from each other, means for securing said receptacles to said base, an anvil mounted on the base independently of the receptacles to form a filling member in the space between said receptacles, and means for securing said anvil to said base.

3. In a device of the herein described class comprising a nut holding receptacle, an anvil formed independently and arranged exteriorly of said receptacle, the crown of said anvil being provided with a hammer holding notch, mounting-means for mounting both the receptacle and anvil, means for securing the receptacle to said mounting-means, and means for securing said anvil to said mounting-means.

4. In a device of the herein described class comprising a nut holding receptacle, an anvil formed of a plurality of independent sections, means for securing the anvil-sections together, and means for mounting both the receptacle and anvil and for receiving and absorbing the force of the hammer blows delivered to said anvil.

5. In a device of the herein described class comprising a pair of nut holding receptacles arranged in close proximity, an anvil arranged between and independently of said receptacles, said anvil following approximately the exterior contour of said receptacles on both sides of a line drawn through the longitudinal center of the receptacles to present nut cracking surfaces of varying widths, and means for mounting both the receptacles and anvil and for receiving and absorbing the force of the hammer blows delivered to said anvil.

In witness whereof, I have hereunto set my hand and seal at Indianapolis, Indiana, this 13th day of March, A. D. one thousand nine hundred and sixteen.

HENRY H. HIGERT. [L. S.]

Copies of this patent may be obtained for five cents each, by addressing the "Commissioner of Patents, Washington, D. C."